United States Patent
de Neef et al.

(10) Patent No.: US 11,050,756 B2
(45) Date of Patent: Jun. 29, 2021

(54) CONTROLLING NETWORK ACCESS OF CUSTOMER-PREMISES EQUIPMENT

(71) Applicant: Koninklijke KPN N.V., Rotterdam (NL)

(72) Inventors: Jurriaan de Neef, Bergschenhoek (NL); Anthonius Johannes van der Knaap, Capelle aan den Ussel (NL); Edo Pappot, The Hague (NL); Adriaan Willem de Graaf, Pijnacker (NL); Henk Velthuizen, Almere (NL); Felix Theodorus Maria Gras, Hilversum (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 16/990,430

(22) Filed: Aug. 11, 2020

(65) Prior Publication Data

US 2021/0067516 A1 Mar. 4, 2021

(30) Foreign Application Priority Data

Sep. 4, 2019 (EP) .................................. 19195357

(51) Int. Cl.
*G06F 15/16* (2006.01)
*H04L 29/06* (2006.01)
*H04L 12/24* (2006.01)

(52) U.S. Cl.
CPC ........ *H04L 63/102* (2013.01); *H04L 41/0806* (2013.01); *H04L 63/0876* (2013.01)

(58) Field of Classification Search
CPC ... H04L 63/10; H04L 63/102; H04L 41/0806; H04L 63/0876

(Continued)

(56) References Cited

U.S. PATENT DOCUMENTS 7,702,753 B2 * 4/2010 Simongini .............. H04L 67/16 709/219
8,578,456 B2 * 11/2013 Lindholm ........... H04L 65/1073 726/5

(Continued)

FOREIGN PATENT DOCUMENTS

WO WO 2009/030012 A1 3/2009

OTHER PUBLICATIONS

Extended European Search Report for EP Application No. 19195357, entitled "Controlling Network Access of Customer-Premises Equipment," dated Jan. 31, 2020.

*Primary Examiner* — Liang Che A Wang
(74) *Attorney, Agent, or Firm* — Hamilton, Brook, Smith & Reynolds, P.C.

(57) ABSTRACT

A system and computer-implemented method are provided for controlling network access of customer-premises equipment which may be connected via a last mile access line to a transport network. The last mile access line may terminate at a line terminal in the transport network. Said controlling may comprise searching a trusted access database for an entry containing a combination of an equipment identifier and a line identifier. If the entry is found and if the entry contains a user identifier having user credentials which are valid according to an authorization database, the network access may be granted. If the entry is not found, temporary access may be granted to a private network which may enable a user identifier and user credentials to be digitally submitted. If the user credentials are valid according to the authorization database, the network access may be subsequently granted.

14 Claims, 8 Drawing Sheets

(58) Field of Classification Search
USPC .................................... 709/223, 226, 229
See application file for complete search history.

(56) References Cited

U.S. PATENT DOCUMENTS 8,627,410 B2 * 1/2014 Hughes ............... H04L 63/0892
 726/3
2009/0063689 A1 * 3/2009 Camille ............. H04L 63/0892
 709/227

* cited by examiner

CONTROLLING NETWORK ACCESS OF CUSTOMER-PREMISES EQUIPMENT

RELATED APPLICATION

This application claims priority under 35 U.S.C. § 119 or 365 to EP Application No. 19195357.9, filed Sep. 4, 2019.

The entire teachings of the above application are incorporated herein by reference.

TECHNICAL FIELD

The invention relates to a system and computer-implemented method for controlling access of customer-premises equipment to a network, such as access to the Internet, wherein the customer-premises equipment is connected via a last mile access line to a transport network and via the transport network to the network. The invention further relates to a computer-readable medium comprising a computer program for causing a processor system to perform the computer-implemented method.

BACKGROUND

The activation of fixed-line Internet access for a customer is currently a complex administrative and technical process. Namely, a network provider typically uses a provisioning process to register customer-premises equipment, such as a modem, in its databases and to grant Internet access to the modem via so-called provisioning processes. Although the provisioning process has as a result that the technical infrastructure is configured to grant Internet access to the modem and thereby to the customer, the provisioning typically involves many (manual) actions, e.g., entering of data, scheduling of events, etc. by administrative or service personnel.

It is a shared frustration amongst customers and network providers that provisioning processes are inherently slow, cumbersome and error-prone due to the involvement of (manual) actions. Disadvantageously, such provisioning processes limit the freedom of customers. For example, the provisioning processes may not allow, or may be too cumbersome to use, for a user to temporarily move to a new location with his/her modem and obtain Internet access at this new location in a simple manner.

The above problem also holds for other types of activating network access for a customer, which may in general also be referred to as a 'granting of network access' or 'granting access to a network'. In general, these problems occur in all technical contexts in which customer-premises equipment is connected via a last mile access line, such as a copper line or a fiberoptic line (e.g., 'Fiber to the x' with any type of 'x', such as Fiber To The Home (FTTH) or Fiber To The Curb (FTTC)) or a combination thereof or a fixed wireless transmission line, to a transport network of a network provider. The transmission via the access line may be based on any known transmission technique, such as DSL, PON, DOCSIS, etc. The last mile access line may physically or wirelessly terminate at a line terminal in the transport network. The transport network may connect the customer-premises equipment to one or more networks which include the network to which access is to be granted and which is in the following simply referred to as 'the network'. This connecting may involve transporting data between the customer-premises equipment and the network, thereby explaining the name 'transport' network. Typically, but not necessarily, the transport network may aggregate traffic of several customer-premises equipment, e.g., by multiplexing using suitable protocols such as IP, NPLS, Ethernet or X25, and may therefore also be referred to as an 'aggregating' network. The provisioning of network access to the customer-premises equipment may involve registering an equipment identifier of the customer-premises equipment and a line identifier of the line terminal via the earlier mentioned administrative processes so that at the particular line terminal, network access may be granted to the particular customer-premises equipment.

Disadvantageously, if a customer would move his/her customer-premises equipment to a new physical location, or would purchase a new customer-premises equipment, e.g., a new modem, the customer would have to take administrative actions to request the network provider to provision the new customer-premises equipment, or his/her existing customer-premises equipment at the new location's line terminal.

SUMMARY

It would be advantageous to obtain a system and computer-implemented method for controlling access of customer-premises equipment to a network, wherein the customer-premises equipment is connected via a last mile access line to a transport network and via the transport network to the network, which addresses one or more of the above-mentioned disadvantages of existing provisioning processes.

In accordance with a first aspect of the invention, a system may be provided for controlling access of customer-premises equipment to a network, wherein the customer-premises equipment may be connected via a last mile access line to a transport network and via the transport network to the network. The last mile access line may terminate at a line terminal in the transport network. The system may comprise:
  a network interface to the transport network;
  a processor subsystem which may be configured to, via the network interface:
    obtain an equipment identifier which uniquely identifies the customer-premises equipment;
    obtain a line identifier which identifies the line terminal;
    search a trusted access database for an entry containing a combination of the equipment identifier and the line identifier; and
  a) if the entry is found and if the entry contains a user identifier having user credentials which are valid according to an authorization database, grant the customer-premises equipment access to the network; or
  b) if the entry is not found, grant temporary access to a private network which enables a user identifier and user credentials to be digitally submitted, and if the user credentials are valid according to the authorization database, grant the customer-premises equipment access to the network.

In accordance with a further aspect of the invention, a computer-implemented method may be provided for controlling access of customer-premises equipment to a network, wherein the customer-premises equipment may be connected via a last mile access line to a transport network and via the transport network to the network. The last mile access line may terminate at a line terminal in the transport network. The method may comprise, via a network interface to the transport network:
  obtaining an equipment identifier which uniquely identifies the customer-premises equipment;

obtaining a line identifier which identifies the line terminal;

searching a trusted access database for an entry containing a combination of the equipment identifier and the line identifier; and a) if the entry is found and if the entry contains a user identifier having user credentials which are valid according to an authorization database, granting the customer-premises equipment access to the network; or b) if the entry is not found, granting temporary access to a private network which enables a user identifier and user credentials to be digitally submitted, and if the user credentials are valid according to the authorization database, granting the customer-premises equipment access to the network.

In accordance with a further aspect of the invention, a computer-readable medium may be provided comprising transitory or non-transitory data representing a computer program. The computer program comprising instructions for causing a processor system to perform the computer-implemented method.

The above measures may be performed within the technical context of the customer-premises equipment, such as a modem, switch, router, access point, set-top box etc., being connected via a last mile access line to a transport network, e.g., of a network provider. The last mile access line may take various forms, including but not limited to a Digital Subscriber Line (DSL) access line (e.g., based on a copper line), a cable access line, an optical network line or a fixed wireless transmission line, which may terminate at a line terminal in the transport network, with the line terminal corresponding in type with the type of last mile access line. The customer-premises equipment may conventionally need to be provisioned by the network provider so as to obtain access to the network. Such access is here and elsewhere also simply referred to as 'network access', and may include various types of network access, including but not limited to access to the Internet or a physical or virtual private network or an application server which is network accessible. In some example, the granting of the network access may involve granting network access to a core network to which the transport network is connected.

The above measures may involve obtaining an equipment identifier which uniquely identifies the customer-premises equipment, such as a MAC address of a modem or any similar type of identifier. Such types of identifiers may typically be obtained from the customer-premises equipment via the last mile access line. In addition, a line identifier may be obtained which identifies the line terminal at which the last mile access line used by the customer-premises equipment terminates.

The above measures may further involve providing a trusted access database which may be searched for an entry containing the combination of the equipment identifier and the line identifier. Here, the term 'combination' may refer to the equipment identifier and the line identifier being part of a same record in the database or being entered in the database in any other way so as to represent the equipment identifier and the line identifier as a specific combination. If such an entry is found, and if the entry further contains a user identifier of which the user credentials are valid according to an authorization database, the network access may be granted to the customer-premises equipment. It is noted that such types of authorization databases, namely ones which contain a validity status of user credentials and which may be searched on the basis of a user identifier, are known per se and may thus be accessed to determine the validity of the user credentials. Here, the term 'validity' may technically correspond to the user credentials existing and not having been flagged or in another way marked so as to denote that the user is not to be granted network access.

However, if such an entry is not found in the authorization database, the system may grant temporary access to the customer-premises equipment to a private network so as to enable a user identifier and user credentials to be digitally submitted via the private network, for example by a user (manually, orally, or using biometrics) or a password manager automatically entering the user identifier and the user credentials via a capture page, or in any other way using the customer-premises equipment and the private network. Here, the term 'temporary access' may refer to an access to the private network which is not meant to be permanent and which may, but does not need to be, limited in time. Furthermore, the private network may be a network which does not constitute the network access which is sought by the customer-premises equipment and/or its user, but rather a separate physical or virtual network. For example, the private network may not allow for full access or any type of access to the Internet. If the user credentials are then determined to be valid according to the aforementioned authorization database, the network access may be granted to the customer-premises equipment.

The above measures may have the effect that it may be determined which customer-premises equipment is connected to a particular line terminal on the basis of the respective identifiers, both of which may be obtained digitally via the transport network. The combination of both identifiers may be seen as 'trusted', in that network access is to be granted to the customer-premises equipment at the particular line terminal, if they have been previously stored in a trusted access database in combination with a user identifier of which the user credentials are currently valid. If this is the case, the customer-premises equipment may be directly granted network access.

If the combination of both identifiers is not found, e.g., because none of the identifiers have been previously stored in the trusted access database or because the equipment identifier is only stored in the database in combination with (an)other line identifier(s) or because the line identifier is only stored in the database in combination with (an)other equipment identifier(s), the customer-premises equipment may still be granted network access without a need for a complex provisioning process. Namely, temporary access may be given to a private network which allows a user identifier and user credentials to be digitally submitted, and if the user credentials are considered to be valid, such validity may then represent an authorization to the system to grant the network access to the customer-premises equipment at that particular line terminal.

The above measures may have as an advantage that network access may be granted to a customer-premises equipment at a particular location, i.e., at a particular line terminal of the transport network, without the need for a complex provisioning process. Namely such network access may be granted automatically if the system is able to find a 'triplet' in the trusted access database of the equipment identifier, the line identifier, and a user identifier of which the user credentials are valid. Even if such a triplet is not found, such a triplet may effectively be created, either explicitly or implicitly, e.g., as temporary data in the memory of the system, if a user identifier and user credentials are received via the temporarily established private network and which credentials are valid according to the authorization database.

A further advantage of the above measures may be that a user may add or replace his/her customer-premises equipment by new customer-premises equipment and obtain network access for the new customer-premises equipment, without having to manually invoke a provisioning process, e.g., by calling a service helpdesk. Another advantage may be that a user may move to a new location, e.g., a vacation home at which the customer-premises equipment may be connected to a new line terminal of the transport network, and may obtain network access without having to manually invoke a provisioning process. While parts of existing provisioning processes may still be used e.g., to administer a validity of a user credentials for a particular type of network access or a validity of the user credentials given a financial status, if the user credentials are valid, the network access may be granted automatically.

In an embodiment, the processor subsystem may be configured to, if the entry is not found and in response to the user credentials being determined to be valid, create an entry in the trusted access database for the user identifier, the entry containing a combination of the equipment identifier and the line identifier. Accordingly, if initially no entry is found in the trusted access database for the combination of the equipment identifier and the line identifier, but if the user identifier and the user credentials which are digitally submitted via the private network are deemed valid according to the authorization database, the system may newly create an entry in the trusted access database which contains the combination of the equipment identifier and the line identifier. Accordingly, if the particular customer-premises equipment is to be given network access again when connected to the particular line terminal, such a network access may be given automatically by the system, e.g., without having to digitally submit the user identifier and the user credentials via the private network.

In an embodiment, the processor subsystem may be configured to create the entry in the trusted access database by replacing one or more previous entries which exist for the user identifier or by creating the entry in the trusted access database in addition to the one or more previous entries. Depending on the configuration of the system and/or the trusted access database, only one entry may be allowed to exist for a particular user identifier, or rather multiple entries simultaneously. In the latter case, the user may be able to switch location and/or customer-premises equipment between a set of locations and/or a set of customer-premises equipment and may be automatically granted network access by the system for each combination of location and customer-premises equipment which is known in the trusted access database.

In an embodiment, the processor subsystem may be configured to:
obtain the equipment identifier, obtain the line identifier, and
search the trusted access database for the entry containing the combination of the equipment identifier and the line identifier,
at a start of a communication session between the customer-premises equipment and the transport network. The system may verify whether the combination of the equipment identifier and the line identifier represents a trusted combination at various times, for example on a continuous, periodic or semi-periodic basis. Additionally or alternatively, the system may verify the above in response to an event, being for example a start of communication session between the customer-premises equipment and the transport network. Such a start of a communication session may represent a logical event for this combination to be verified by the system. Accordingly, in accordance with this embodiment, the system may be an event-driven system.

In an embodiment, the processor subsystem may be configured to grant the network access to one of:
the Internet;
a physical or virtual private network; and
an application server which is network accessible.

The network access may thus be granted to the Internet but also to private networks and/or to specific application servers which are network accessible. It is noted that the above-described private network is a different private network than the one to which temporary access is given by the system in case the entry is not found. In general, the network access may be associated with a particular service, for example one offered or hosted by the application server or the private network. Accordingly, a specific type of network access may be granted to a specific type of service, such as Internet access, television, telephony, e-mail, customer specific services such as corporate VPN access, or specific Internet services such as online banking, news, or entertainment, etc.

In an embodiment, the processor subsystem may be configured to, if the entry containing the combination of the equipment identify and the line identifier is found in the trusted access database, grant the network access via a service provider which is identified in the entry. The trusted access database may, in addition to the equipment identifier, the line identifier and the user identifier, also contain an identifier of a service provider. Accordingly, the system may grant network access via the service provider which is identified in the entry, for example by having network traffic of the customer-premises equipment routed to a physical or virtual private network of the service provider or by signaling the service provider that the network access is granted and by reporting data associated with the network access to the service provider. This may allow the system to grant network access for different service providers.

In an embodiment, the processor subsystem may be configured to, if the user credentials are not known according to the authorization database, enable the user identifier and the user credentials to be digitally created in the authorization database via the private network. It may be the case that the user identifier and the user credentials of a user have not been created, for example because the user is not yet a customer of the network provider or a service provider. By allowing the user identifier and the user credentials to be digitally created in the authorization database via the private network, the user may be enabled to digitally subscribe or register so as to be granted network access. Thereby, a further part of the traditional provisioning process involving manual actions of administrative or support staff of the network provider or service provider may be replaced by automatic functionality of the system.

In an embodiment, the processor subsystem may be configured to, if the user credentials are not valid according to the authorization database, enable the user credentials to be digitally revalidated in the authorization database via the private network. For example, if a subscription of the user which is associated with the network access has expired, the user may renew his/her subscription via the private network.

In an embodiment, the processor subsystem may be configured to i) enable an electronic payment process to be performed via the private network, and ii) create or revalidate the user credentials in the authorization database subject to the electronic payment process having been completed successfully. For example, the electronic payment process may be a so-called online payment or e-payment process which may involve the user being redirected, e.g., via or as part of a capture page, to an e-payment webpage in which the user may enter credentials authorizing an electronic payment to be made. If the electronic payment process is completed successfully, the user credentials may be created or revalidated in the authorization database, resulting in the user's customer-premises equipment being granted network access.

In an embodiment, the processor subsystem may be configured to enable the user identifier and the user credentials to be digitally submitted via one or more capture pages in the private network. A capture page, or a linked sequence of capture pages, may be well-suited to enable the user identifier and the user credentials to be digitally submitted to the system. In some embodiments, a first capture page may allow a user to select a desired service or service provider. In response to said selection, the user may be redirected to a specific capture page of the selected service or service provider in which the user identifier and the user credentials may be digitally submitted.

In an embodiment, the last mile access line may be a Digital Subscriber Line (DSL) and the line terminal may be a Digital Subscriber Line Access Multiplexer (DSLAM). In an embodiment, the last mile access line may be a cable access line and the line terminal may be a Cable Modem Termination System (CMTS). In an embodiment, the last mile access line may be an optical network line and the line terminal may be an Optical Line Terminal (OLT). In an embodiment, the last mile access line may be a fixed wireless access line and the line terminal may be a wireless access gateway. In an embodiment, the customer-premises equipment is one of a residential gateway such as a modem, switch, router or access point, a set-top box and a terminal device capable of being granted network access. In an embodiment, the system may be configured to interface with one of a Remote Authentication Dial-In User Service (RADIUS) server and a Home Subscriber Server (HSS). In an embodiment, the system may be implemented as (part of) a RADIUS server or HSS that is modified for this purpose.

In an embodiment, the trusted access database may be a distributed database comprised of separate databases which may but do not need to contain linked entries, or may be a single database provided by a distributed system of data storage devices. In an embodiment, the trusted access database may comprise the authorization database or vice versa or may contain linked entries thereto.

It will be appreciated by those skilled in the art that two or more of the above-mentioned embodiments, implementations, and/or aspects of the invention may be combined in any way deemed useful.

Modifications and variations of the system, the computer-implemented method and/or the computer program, which correspond to the described modifications and variations of another one of these entities, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

API application programming interface
BNG broadband network gateway
CMTS cable modem termination system
CSP commercial service provider
DSL digital subscriber line
DSLAM digital subscriber line access multiplier
HSS home subscriber server
NSP network service provider
NT network termination
OLT optical line terminal
ONT optical network termination
PPP point-to-point protocol
RADIUS remote authentication dial-in user service
RG residential gateway
1 residential gateway (RG)
3 network terminal, optical network terminal (NT, ONT)
4 last mile access line
5 provisioning system for line terminal
6 line terminal (DSLAM)
7 ethernet aggregation in transport network
8 broadband network gateway (BNG)
9 remote authentication dial-in user service (RADIUS)
10 trusted access database
11 provisioning virtual private network (VPN)
12 web server
13 user authentication function of service provider
14 service provider virtual private network (VPN)
15 Internet
101-517 steps in use cases
600 system for controlling network access
610 network interface
620 processor subsystem 630 data storage
700 method for controlling network access
710 obtaining equipment identifier
720 obtaining line identifier
730 searching trusted access database
740 entry found in the trusted access database?
750 granting temporary access to private network
760 user credentials valid?
770 granting network access
800 computer-readable medium
810 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS the following embodiments relate to a system and computer-implemented method for controlling network access of customer-premises equipment which may be connected via a last mile access line to a transport network and wherein the last mile access line may terminate at a line terminal in the transport network.

By way of example, the following assumes the customer-premises equipment to be a residential gateway, and specifically a DSL modem, the last mile access line to be a copper or fiber line, the line terminal to be a DSLAM, the network access being to the Internet and the system being implemented by a modified RADIUS. Furthermore, it is assumed that the last mile access line and the thereto connected transport network is operated by a network provider which may allow at least one service provider, which is also referred to as a 'commercial' service provider (CSP), to make use of the network provider's infrastructure to enable the CSP to provide the Internet access to the residential gateway, e.g., on the basis of a service subscription.

It will be appreciated, however, that the described measures may be also applied to other technical contexts, for example to different types of last mile access lines, without or with a technical distinction between network provider and service provider, with a different implementation of the system, e.g. as a HSS instead of a RADIUS, with a different implementation of the trusted access database, etc.

Figure 1:
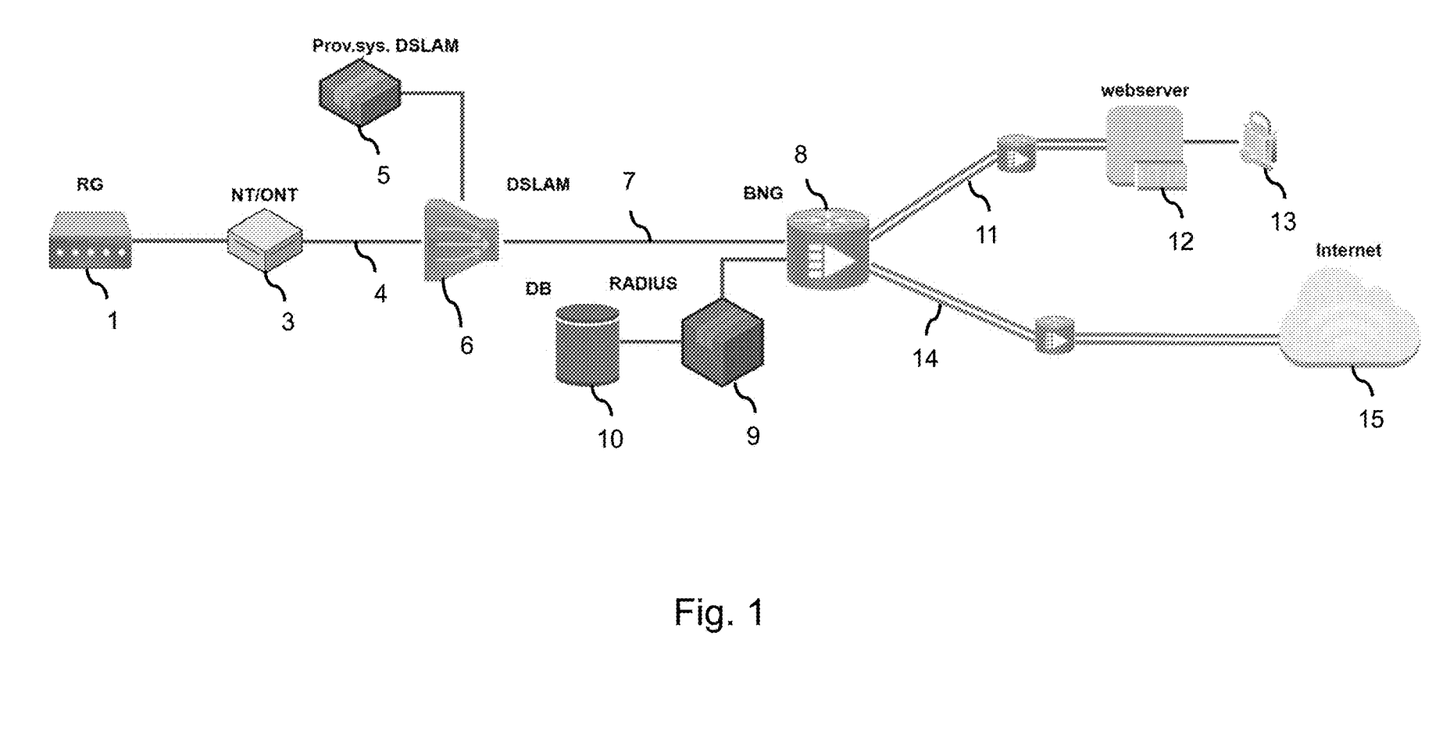
FIG. 1 shows a network overview in which a residential gateway in the form of a modem seeks to access the Internet while being connected to a transport network via a last mile access line, such as a copper line and/or a fiber line.

FIG. 1 shows a network overview in which a residential gateway (RG) 1 in the form of a modem seeks access to the Internet while being connected to a transport network via a last mile access line. More specifically, the residential gateway 1 is shown to be connected to a network terminal (NT) 3, such as an optical network terminal (ONT), which may be a residential terminal of a last mile access line 4, being in this example a copper or fiber line. The last mile access line 4 is shown to terminate at a line terminal 6 of a transport network. The line terminal 6 may be a DSLAM which may be controlled by a provisioning system 5. Data traffic originating from the line terminal 6 may be transported by ethernet aggregation 7 via the transport network to a broadband network gateway (BNG) 8, which may be controlled by a RADIUS 9. The network components and architecture as described in this paragraph are known per se.

Unlike known RADIUS-es, the RADIUS 9 may be configured to control network access of the residential gateway 1 to the Internet in the following manner. Firstly, the RADIUS 9 may, via the transport network and via the last mile access line 4, obtain an equipment identifier which uniquely identifies the residential gateway 1 and a line identifier which identifies the line terminal 6. For example, the RADIUS 9 may obtain a MAC address of the residential gateway 1, being a non-limiting example of a unique identifier of customer-premises equipment. In a specific example, the RADIUS 9 may obtain the MAC address of the residential gateway 1 as part of a PPP session request which may be sent by the residential gateway 1 to the broadband gateway 8. The line identifier may be inserted into the PPP session request of the residential gateway 1 by the line terminal 6 in form of the DSLAM. However, instead of a PPP session request, various other techniques are known within telecommunications for obtaining such an equipment identify and line identifier, for example using DHCP, such as specifically DHCPv6, IPv6 NA/ND Neighbor Advertisement/Discovery, etc. Alternatives to the MAC address as equipment identifier include but are not limited to eSIM, a username, a digital certificate or any other type of information which may be transmitted over the network to identify the customer-premises equipment.

The RADIUS 9 may be further configured to search a trusted access database 10 for an entry containing a combination of the equipment identifier, e.g., the MAC address, and the line identifier. Such a trusted access database may be a separate database or may be part of the RADIUS 9, and may in some examples be a modified variant of a known database storing authorization data for the RADIUS 9.

If such an entry is found in the trusted access database 10 and if the entry contains a user identifier having user credentials which are valid according to an authorization database, the RADIUS 9 may grant network access to the residential gateway 1, namely by granting access to the Internet 16. To verify whether the user credentials are valid, the RADIUS 9 may query an authorization database. Although not shown separately in FIG. 1, in an embodiment, the trusted access database 10 may be part of or combined with the authorization database. In other embodiments, both databases may be separate databases which may both be accessible to the RADIUS 9. The manner of subsequently granting network access will be further described with reference to FIGS. 2-6, but may in these examples involve the RADIUS 9 instructing the broadband network gateway 8 to grant such access to the residential gateway 1.

If such an entry is not found, the RADIUS 9 may grant temporary access to a private network, which is in the example of FIG. 1 a virtual private network (VPN) 11 and which may be used in the provisioning of the residential gateway 1. Namely, the private network 11 may enable a user identifier and user credentials to be digitally submitted. For example, the private network 11 may provide access to a web server 12 which may for example provide a so-called capture page via which the user identifier and user credentials may be digitally submitted, e.g., by entering them into a form or in any other suitable manner. Having digitally submitted the user identifier and the user credentials, the validity of the user credentials may be determined. This may for example involve a user authorization function 13, which in some examples may be operated by a service provider which may be different from the network provider operating the last mile access line 4 and the transport network. The user authorization function 13 may, if the user credentials are deemed to be valid, communicate this to the RADIUS 9, either directly, for example via a message exchange, or indirectly, for example by creating an entry or updating an entry in the authorization database. In both cases, the authorization database accessible by the RADIUS 9 may be updated, and accordingly, the RADIUS 9 may determine the validity of the user credentials. If the user credentials are valid, the RADIUS 9 may then grant network access to the residential gateway 1, for example by, as already described above, instructing the broadband network gateway 8 to grant such access to the residential gateway 1.

FIGS. 2-6 illustrate the operation of the RADIUS 9 with respect to granting network access to the residential gateway 1 in the context of various use case.

Figure 2:
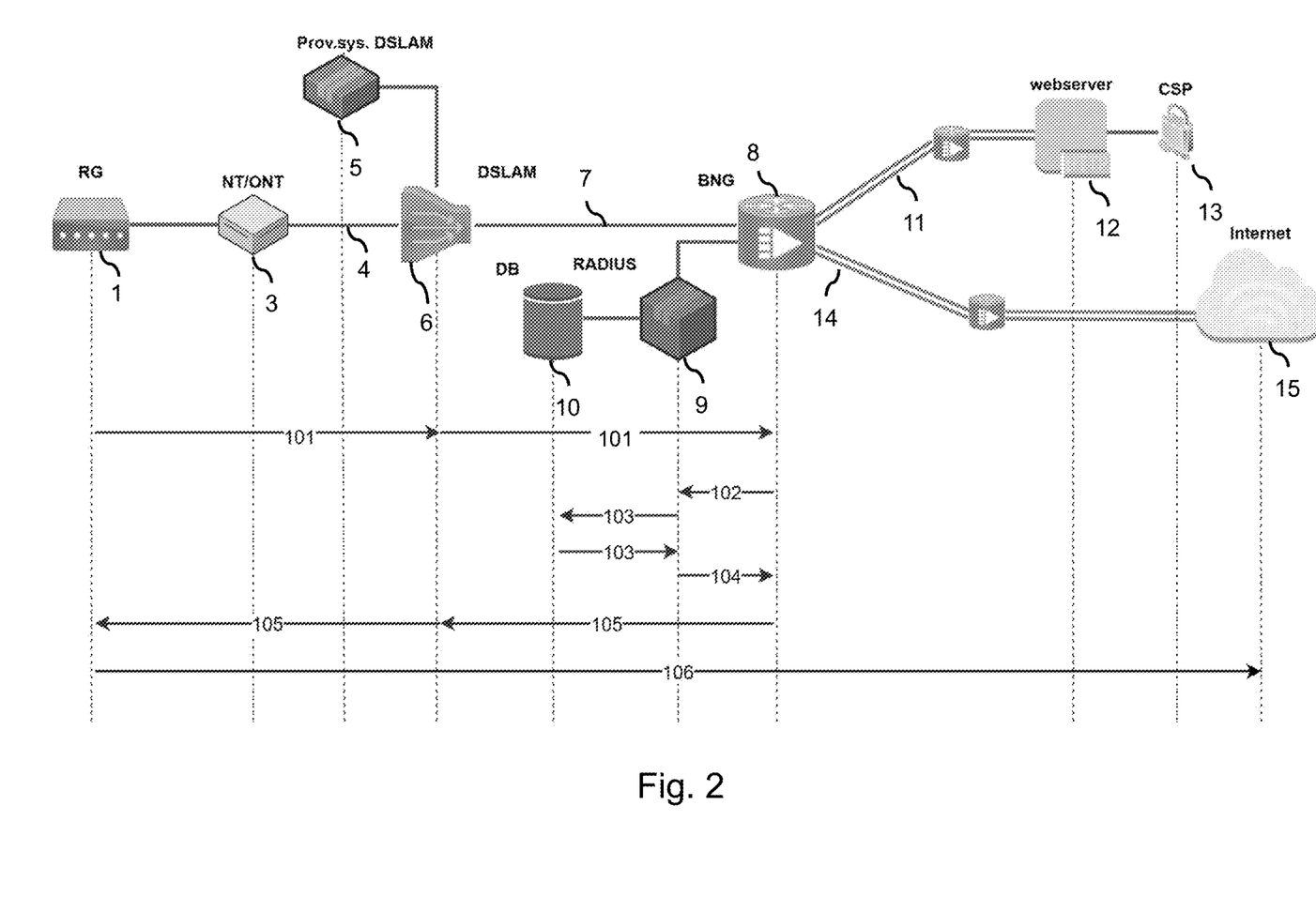
FIG. 2 shows a use case in which the modem is repowered and is granted access to the Internet by a modified RADIUS on the basis of the modem's equipment identifier and a line identifier of the line terminal to which it is connected.

FIG. 2 shows a first use case in which the residential gateway is re-powered after having previously had access to the Internet. This use case may illustrate that the RADIUS 9 may check the validity of the combination of equipment identifier, line identifier and user identifier having valid user credentials at a start of a communication session between the residential gateway 1 and the transport network. This use case may involve the message exchange shown below, in which the numbers in the first column, which may identify messages and/or steps of the use case, correspond to the reference numerals in FIG. 2. Here, the broadband network gateway is referred to as an 'edge' as it may represent an edge of the transport network to the last-mile access line.

| | |
|---|---|
| 101 | PPP-request from RG to edge |
| 102 | Edge forwards request to RADIUS-application |
| 103 | Look-up in database based on Line-ID and MAC-address. Result: Line-ID and MAC-address not changed |
| 104 | RADIUS sends 'OK' to edge, edge connects PPP-session to VPN of CSP |
| 105 | 'OK' (PPP Accept) forwarded to RG (incl. IP-related settings) |
| 106 | Data traffic from customer to service (Internet) |

Briefly speaking, in step 101, the residential gateway 1 may request network access via a PPP request to the broadband network gateway 8, i.e., the edge. In step 102, the edge may forward the request to the RADIUS 9, which is in the above table also referred to as a RADIUS application as it may be implemented by an application running on a server. In step 103, the RADIUS 9 may look-up the MAC address, which may be newly received with the PPP request from the residential gateway 1, and the line identifier in the trusted access database. As an entry containing both identifiers may exist from before, the RADIUS 9 may determine that the line ID and the MAC address represents a trusted combination which has not been changed with respect to a situation before the re-powering of the residential gateway 1. Accordingly, in step 104, the RADIUS 9 may send an 'OK' message to the edge and the edge may provide network access to the residential gateway 1, which in this example may be given in step 105 by connecting a PPP session of the residential gateway 1 to a virtual private network 14 of a commercial service provider (CSP) via which the residential gateway 1 may access the Internet 16. Accordingly, in step 106, data traffic may flow between the residential gateway 1 and the Internet 16, representing the 'service' cited above.

Figure 3:
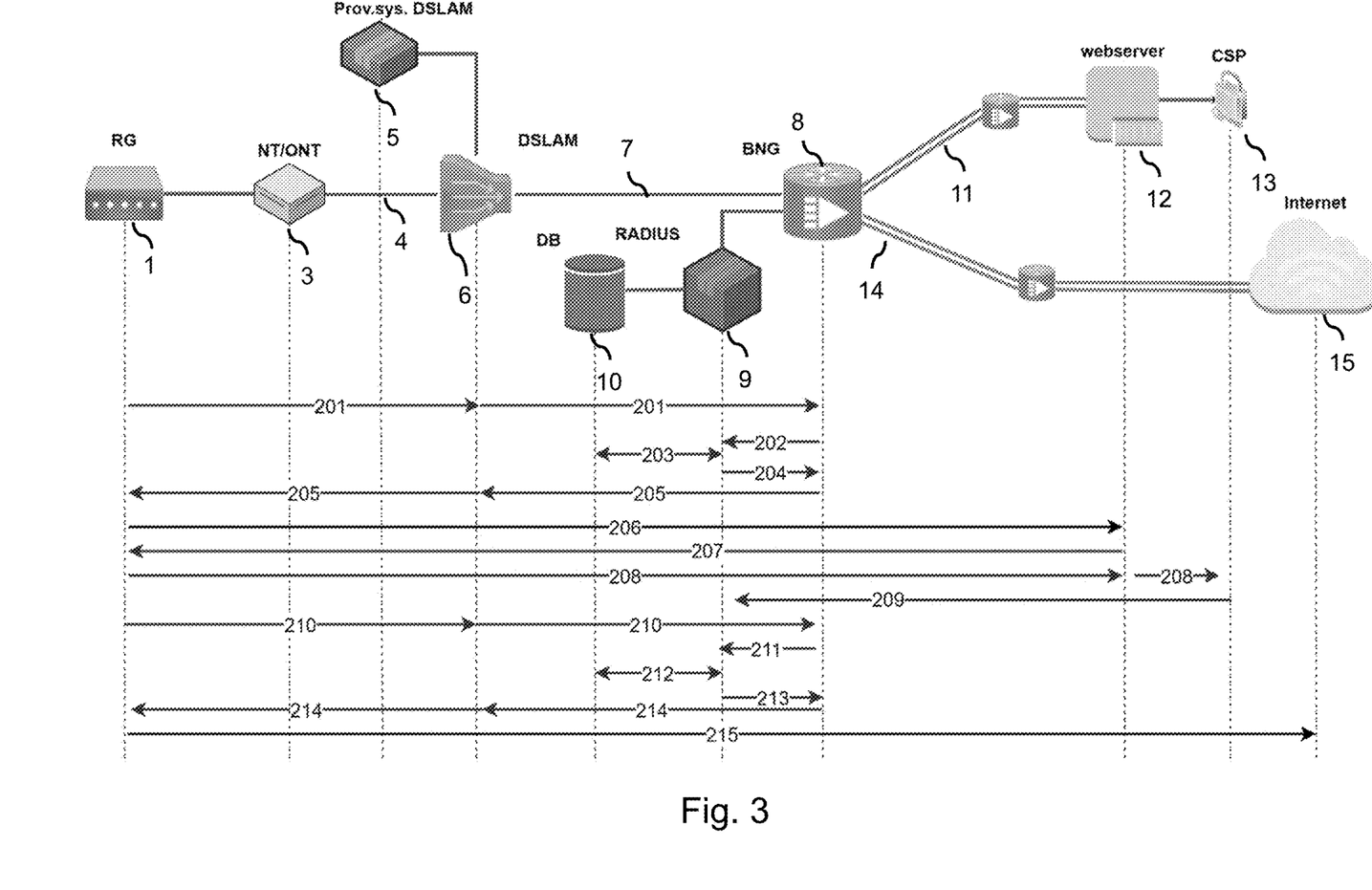
FIG. 3 shows a use case involving a new modem.

FIG. 3 shows a second use case, in which a customer has connected a new modem. This use case may involve the message exchange shown below:

| | |
|---|---|
| 201 | PPP-request from RG to edge |
| 202 | Edge forwards request to RADIUS-application |

-continued

| | |
|---|---|
| 203 | Look-up in database based on Line-ID and MAC-address. Result: MAC-address has changed |
| 204 | RADIUS sends 'OK' to edge, edge connects PPP-session to 'Provision VPN' |
| 205 | 'OK' (PPP Accept) forwarded to RG (incl. IP-related settings) |
| 206 | Data traffic flows from customer to webpage to ask for confirmation |
| 207 | Customer is challenged to authenticate using credentials |
| 208 | Customer sends credentials and request forwarded to CSP |
| 209 | CSP sends update to RADIUS. New MAC-address added to existing record |
| 210 | PPP-request from RG to edge |
| 211 | Edge forwards request to RADIUS-application |
| 212 | Look-up in database based on Line-ID and MAC-address. Result: Line-ID and MAC-address not changed |
| 213 | RADIUS sends 'OK' to edge, edge connects PPP-session to VPN of CSP |
| 214 | 'OK' (PPP Accept) forwarded to RG (incl. IP-related settings) |
| 215 | Data traffic from customer to service (Internet) |

Steps 201 and 202 may correspond to previous steps 101 and 102. In step 203, the RADIUS 9 may determine that the combination of line identifier and MAC address does not yet exist in the trusted access database as the residential gateway/modem may be newly purchased by a customer, e.g., as replacement of a previous modem. In response, in steps 204 and 205, the RADIUS 9 may instruct the edge 8 to connect a PPP session of the residential gateway 1 to a provisioning VPN 11 and the edge 8 may do so. In step 206, the residential gateway 1 may communicate with a web server 12 which is accessible via the provisioning VPN 11. The web server 12 may in steps 206 and 207 request and enable a customer to provide his/her user identifier and user credentials, which may be forwarded in step 208 by the web server 12 to a user authentication function 13 of the commercial service provider. In step 209, the commercial service provider may then send an update to the RADIUS 9 to instruct the RADIUS 9 to add the new MAC address to an existing record. Such a record may already be existing in the trusted access database 10, for example for the particular line identifier and/or the user identifier. Steps 210-215 then correspond to the previous steps 101-106 of FIG. 2 by which the residential gateway 1 may subsequently obtain access to the Internet since now the combination of line identifier and MAC address has been registered as a trusted combination in the trusted access database 10.

A third use case may be the following, in which a user may move his/her residential gateway/modem to a new location and therefore to a new line terminal. For this new line terminal, the following steps may be performed, which may correspond to the steps of the second use case except where marked with an asterix (*). The steps may be performed by the RADIUS 9 on a continuous, periodic, or event driven basis for a particular line terminal. Accordingly, for this line terminal, the line identifier may be considered to be an existing identifier at which now a new MAC address is seen. Accordingly, in step 203, the line identifier is considered to be an existing line identifier while the MAC address may be considered to be a new, i.e. changed MAC address. In other words, while the line identifier and the MAC address may exist as part of separate records in the database, they may not yet exist as a combination in one record. This may then trigger the re-authentication of the user in steps 204 and following.

| | |
|---|---|
| 201 | PPP-request from RG to edge |
| 202 | Edge forwards request to RADIUS-application |
| 203 | Look-up in database based on Line-ID and MAC-address. Result: MAC-address has changed |
| 204 | RADIUS sends 'OK' to edge, edge connects PPP-session to 'Provision VPN' |
| 205 | 'OK' (PPP Accept) forwarded to RG (incl. IP-related settings) |
| 206 | Data traffic flows from customer to webpage to ask for confirmation |
| 207 | Customer is challenged to authenticate using credentials |
| 208 | Customer sends credentials and request forwarded to CSP |
| 209* | CSP sends update to RADIUS. New Line-ID added to existing record |
| 210 | PPP-request from RG to edge |
| 211 | Edge forwards request to RADIUS-application |
| 212 | Look-up in database based on Line-ID and MAC-address. Result: Line-ID and MAC-address not changed |
| 213 | RADIUS sends 'OK' to edge, edge connects PPP-session to VPN of CSP |
| 214 | 'OK' (PPP Accept) forwarded to RG (incl. IP-related settings) |
| 215 | Data traffic from customer to service (Internet) |

In step 209*, the commercial service provider may then send an update to the RADIUS 9 to instruct the RADIUS 9 to add the new line identifier to an existing record, which may be an existing record of the user as identified by steps 207 and 208.

Figure 4:
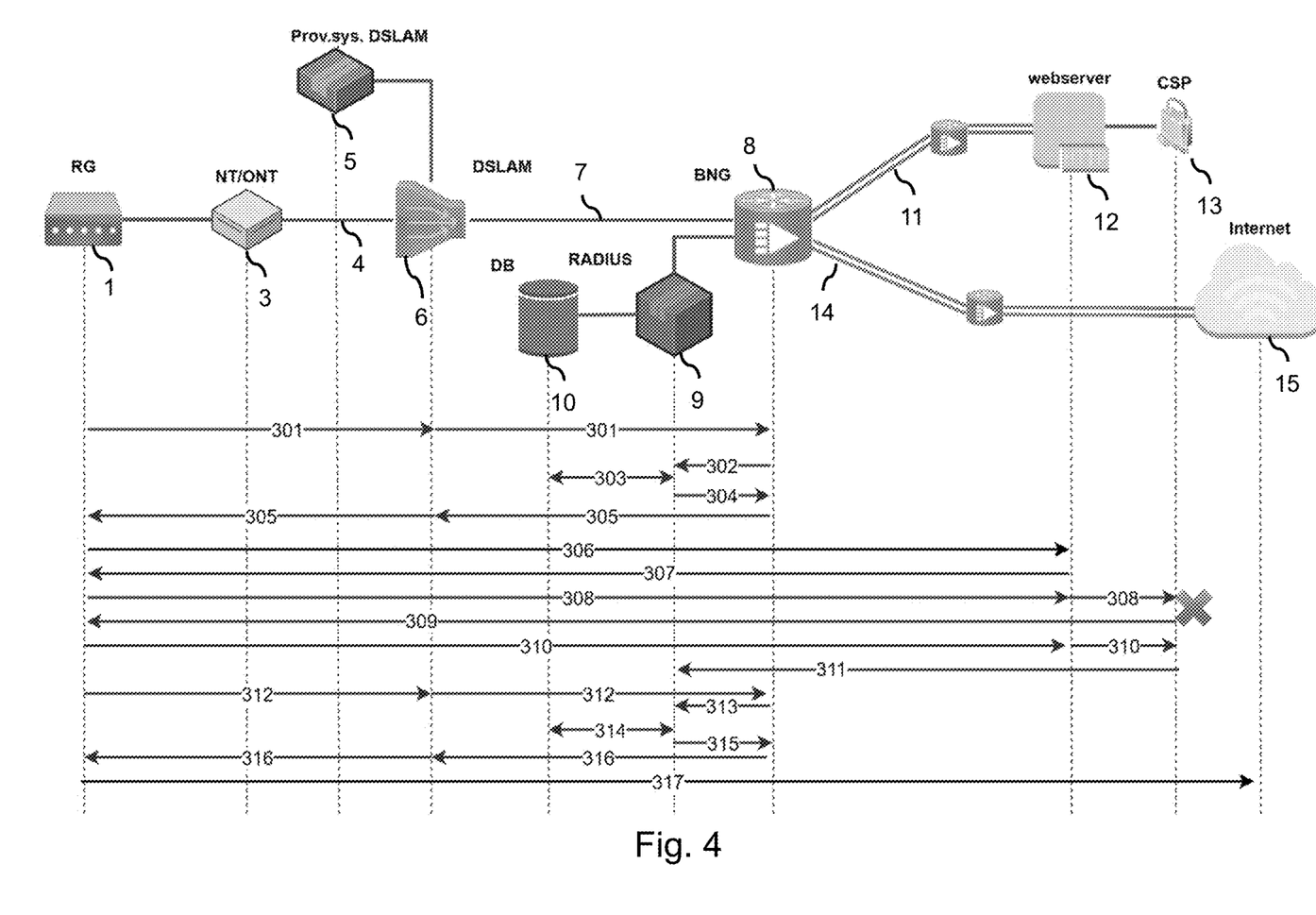
FIG. 4 shows a use case in which a customer subscribes to a new service provider and in which the customer's modem is granted Internet access.

FIG. 4 shows fourth use case in which a customer, which previously had a subscription to a previous service provider, subscribes to a new service provider and in which the customer's modem is granted Internet access.

| | |
|---|---|
| 301 | PPP-request from RG to edge |
| 302 | Edge forwards request to RADIUS-application |
| 303 | Look-up in database based on Line-ID and MAC-address. Result: No valid subscription |
| 304 | RADIUS sends 'OK' to edge, edge connects PPP-session to 'Provision VPN' |
| 305 | 'OK' (PPP Accept) forwarded to RG (incl. IP-related settings) |
| 306 | Data traffic flows from customer to webpage to ask for confirmation |
| 307 | Customer is challenged to authenticate using credentials |
| 308 | Customer sends credentials and request forwarded to CSP |
| 309 | No authentication found, option to select provider |
| 310 | Customer sends credentials and request forwarded to CSP |
| 311 | CSP sends update to RADIUS. New Line-ID and new MAC address added to existing record |
| 312 | PPP-request from RG to edge |
| 313 | Edge forwards request to RADIUS-application |
| 314 | Look-up in database based on Line-ID and MAC-address. Result: Line-ID and MAC-address not changed |
| 315 | RADIUS sends 'OK' to edge, edge connects PPP-session to VPN of CSP |
| 316 | 'OK' (PPP Accept) forwarded to RG (incl. IP-related settings) |
| 317 | Data traffic from customer to service (Internet) |

Steps 301 and 302 may correspond to previous steps 201 and 202. In step 303, the RADIUS 9 may determine from searching the trusted access database 10 that for the combination of line identifier and MAC address there exists no valid subscription. Steps 304-308 may correspond to previous steps 204-208. In step 309, it may be determined that no authentication can be found, for example by the web server 12 in combination with the user authentication function 13, and an option may be provided to the user to select a service provider, for example via a service provider selection capture page. In step 310, the credentials of the user may then be forwarded to the selected service provider. In step 311, the line identifier and MAC address may then be added as new entries to an existing record of the user in the trusted access database 10. Steps 312-317 may then correspond to previous steps 210-215.

A fifth use case may be the following, in which a customer changes his/her contract. Examples may be upgrading or downgrading of a subscription, but may also be adding or removing service modules, such as adding TV to an Internet contract, or the service provider changing the subscription (e.g., the customer may have to accept a security update or accept new terms and conditions before the customer can continue to use the service). The steps of the fifth use case correspond to those of the fourth use case except where marked with an asterix (*), namely steps 303* and 311*.

| | |
|---|---|
| 301 | PPP-request from RG to edge |
| 302 | Edge forwards request to RADIUS-application |
| 303* | Look-up in database based on Line-ID and MAC-address. Result: Updated subscription |
| 304 | RADIUS sends 'OK' to edge, edge connects PPP-session to 'Provision VPN' |
| 305 | 'OK' (PPP Accept) forwarded to RG (incl. IP-related settings) |
| 306 | Data traffic flows from customer to webpage to ask for confirmation |
| 307 | Customer is challenged to authenticate using credentials |
| 308 | Customer sends credentials and request forwarded to CSP |
| 309 | No authentication found, option to select provider |
| 310 | Customer sends credentials and request forwarded to CSP |
| 311* | CSP sends update to RADIUS. Same Line-ID and same MAC address, update existing record |
| 312 | PPP-request from RG to edge |
| 313 | Edge forwards request to RADIUS-application |
| 314 | Look-up in database based on Line-ID and MAC-address. Result: Line-ID and MAC-address not changed |
| 315 | RADIUS sends 'OK' to edge, edge connects PPP-session to VPN of CSP |
| 316 | 'OK' (PPP Accept) forwarded to RG (incl. IP-related settings) |
| 317 | Data traffic from customer to service (Internet) |

In step 303*, the RADIUS 9 may determine that an updated subscription exists for the combination of line identifier and MAC address. Accordingly, in step 311*, the user authentication function 13 may send an update to the RADIUS 9 to update an existing record of the user to include the line identifier and the MAC address.

Figure 5:
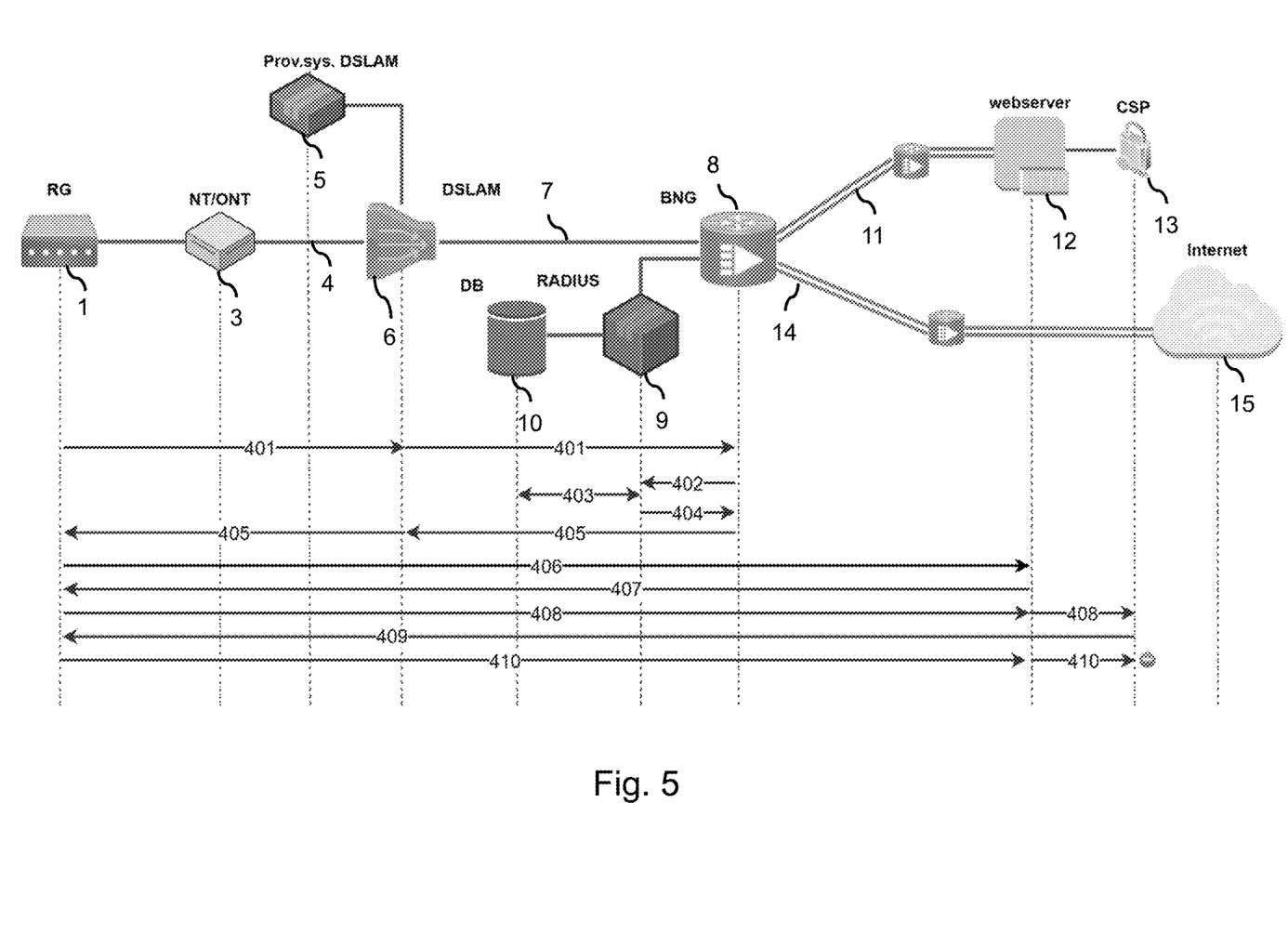
FIG. 5 shows a use case in which a customer cancels a service contract.

FIG. 5 shows a sixth use case in which a customer cancels a service contract. Here, steps 401 and 402 correspond to the previous steps 301 and 302, while in step 403, the RADIUS 9 may determine that for the entry comprising the line identifier and the MAC address, the subscription has been deleted. The RADIUS 9 may then proceed with steps 404-408 which may correspond to the previous steps 304-308. At step 409, it may be determined, for example by the user authentication function 13, that no authentication can be found. The user may be presented the option to select a provider but as no valid subscription exists, in step 410, the user cannot authenticate and the connection remains inactive in that the user cannot access the Internet.

| | |
|---|---|
| 401 | PPP-request from RG to edge |
| 402 | Edge forwards request to RADIUS-application |
| 403 | Look-up in database based on Line-ID and MAC-address. Result: Deleted subscription |
| 404 | RADIUS sends 'OK' to edge, edge connects PPP-session to 'Provision VPN' |
| 405 | 'OK' (PPP Accept) forwarded to RG (incl. IP-related settings) |
| 406 | Data traffic flows from customer to webpage to ask for confirmation |
| 407 | Customer is challenged to authenticate using credentials |
| 408 | Customer sends credentials and request forwarded to CSP |
| 409 | No authentication found, option to select provider |
| 410 | Since no valid subscription, user cannot authenticate, connection remains inactive |

Figure 6:
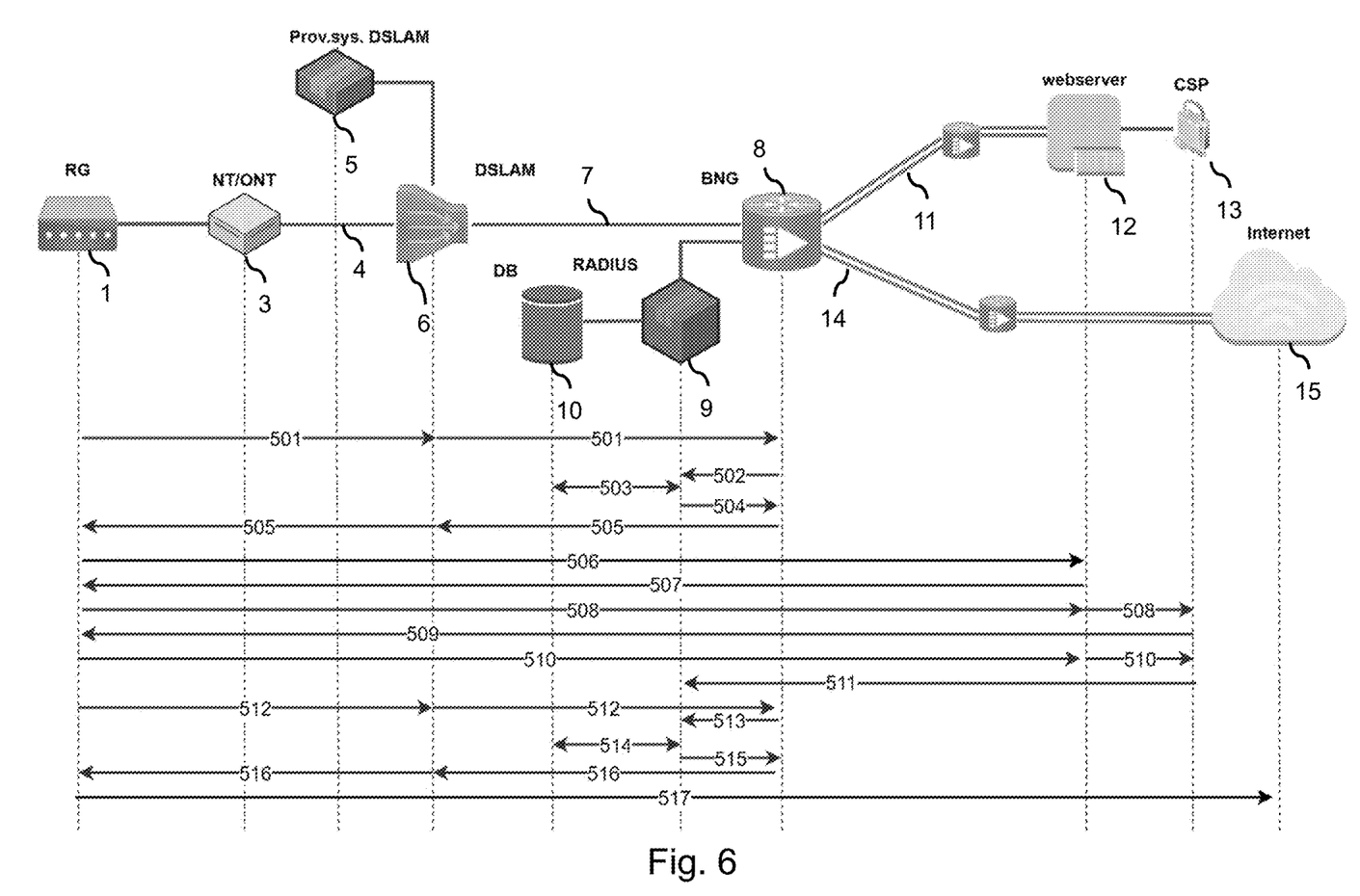
FIG. 6 shows a use case in which a customer is new to a service provider.

FIG. 6 shows a seventh use case in which a new customer with a new contract registers his/her modem for the first time. Here, steps 501 and 502 correspond to the previous steps 401 and 402, while in step 503, the RADIUS 9 may determine that a new modem has been registered at a particular line terminal on the basis of the new MAC address. The RADIUS 9 may then proceed with steps 504-510 which may correspond to the previous steps 404-410. At step 511, the commercial service provider, for example using the user authentication function 13, may instruct the RADIUS 9 to add the line identifier and the new MAC address to a new record. In an alternative example, a record may already exist for the line identifier, and the MAC address may be added to this particular record which may then also be associated with the user (identifier). A result, the user may then access the Internet based on steps 512-517 which correspond to for example steps 312-317 as previously described.

| | |
|---|---|
| 501 | PPP-request from RG to edge |
| 502 | Edge forwards request to RADIUS-application |
| 503 | Look-up in database based on Line-ID and MAC-address. Result: New Line-ID, new MAC address |
| 504 | RADIUS sends 'OK' to edge, edge connects PPP-session to 'Provision VPN' |
| 505 | 'OK' (PPP Accept) forwarded to RG (incl. IP-related settings) |
| 506 | Data traffic flows from customer to webpage to ask for confirmation |
| 507 | Customer is challenged to authenticate using credentials |
| 508 | Customer sends credentials and request forwarded to CSP |
| 509 | No authentication found, option to select provider |
| 510 | Customer sends credentials and request forwarded to CSP |
| 511 | CSP sends update to RADIUS. New Line-ID and new MAC address, create new record |
| 512 | PPP-request from RG to edge |
| 513 | Edge forwards request to RADIUS-application |
| 514 | Look-up in database based on Line-ID and MAC-address. Result: Line-ID and MAC-address not changed |
| 515 | RADIUS sends 'OK' to edge, edge connects PPP-session to VPN of CSP |
| 516 | 'OK' (PPP Accept) forwarded to RG (incl. IP-related settings) |
| 517 | Data traffic from customer to service (Internet) |

It will be appreciated that various alternative embodiments for the above use case, as well as various alternative use cases, may exist as well. Although not explicitly shown in a use case, the customer-premises equipment may also be another type of residential gateway, such as a switch, router or access point. The customer-premises equipment may also be a set-top box, or in general a terminal device capable of being granted network access by the system. Furthermore, although the system for controlling network access of the customer-premises equipment has been shown to be implemented by a RADIUS, the system may also be implemented in any other way, for example as or as part of a home subscriber server (HSS) or any other suitable system.

In general, the system may interact and allow interaction with a service provider's systems or databases, for example via an application programming interface (API). This may allow the system to, for example, access user identifiers and determine the validity of user credentials from a database of the service provider, and/or the service provider to read from/write to the trusted access database. For that purpose, any suitable protocol may be used, including but not limited to REST and XML.

Figure 7:
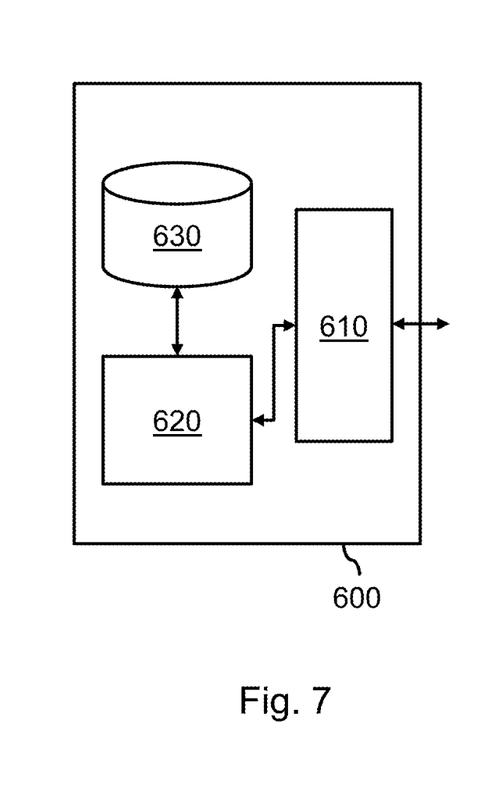
FIG. 7 shows a system for controlling network access of customer-premises equipment which is connected via a last mile access line.

FIG. 7 shows a system 600 for controlling network access of customer-premises equipment, and may be, but is not limited to, the RADIUS as described with the use cases of FIGS. 1-6. The system 600 may comprise a network interface 610 to the transport network. Such a network interface may take various forms, including but not limited to an ethernet interface, a fiberoptic interface or any other type of suitable network interface. In some embodiments, the network interface may comprise a physical interface part, e.g., based on ethernet, fiberoptic, etc. connectivity, and a virtual interface part which may be based on, e.g., IP network ipv6 or any other protocol at Layer 2/3/4 of the OSI model. The system 600 may further comprise a processor subsystem 620 which may be configured to, via the network interface 610 and during operation of the system 600, obtain an equipment identifier which uniquely identifies the customer-premises equipment, obtain a line identifier which identifies the line terminal, and search a trusted access database for an entry containing a combination of the equipment identifier and the line identifier. If the entry is found and if the entry contains a user identifier having user credentials which are valid according to an authorization database, the processor subsystem 620 may, using the network interface 610, grant the network access to the customer-premises equipment, or if the entry is not found, grant temporary access to a private network which enables a user identifier and user credentials to be digitally submitted. If the user credentials are then valid according to the authorization database, the processor subsystem 620 may, using the network interface 610, grant the network access to the customer-premises equipment.

In general, the processor subsystem 620 may be configured, e.g., by hardware design or software, to perform the operations described in this specification in as far as pertaining to the system or computer-implemented method for controlling network access of customer-premises equipment. For example, the processor subsystem 620 may be embodied by a single Central Processing Unit (CPU), but also by a combination or system of such CPUs and/or other types of processing units.

FIG. 7 further shows the system 600 comprising a data storage 630, such as a hard disk, a solid-state drive or an array thereof, which may be used by the processor subsystem 620 for buffering or storing data. In some examples, the data storage 630 may comprise the trusted access database and/or the authorization database. In such examples, the data storage 630 may also be an external data storage, which may be accessible via the network interface 610 or via a suitable data storage interface.

In general, the system 600 may be implemented at least in part by a device or apparatus, such as a server. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function of the system 600 may be implemented as a circuit. However, the system 600 may also be embodied by a distributed system of such devices or apparatuses, e.g., a distributed system of servers.

Figure 8:
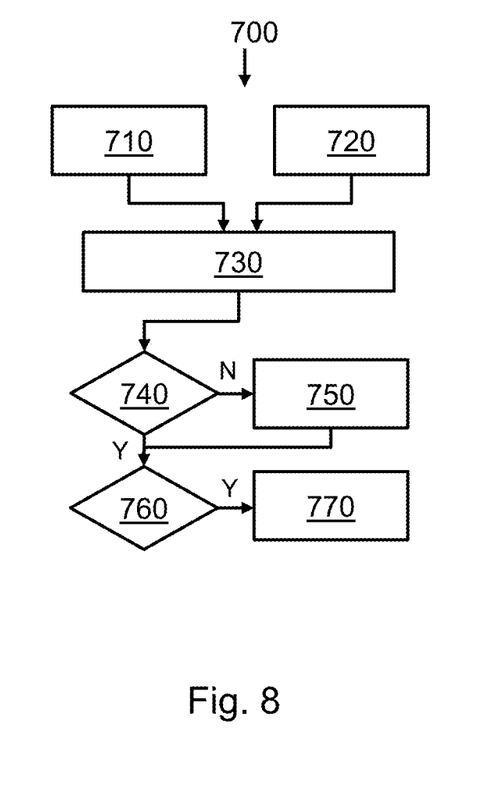
FIG. 8 shows a computer-implemented method for controlling network access of customer-premises equipment which is connected via a last mile access line.

FIG. 8 shows a computer-implemented method 700 for granting network access of customer-premises equipment which is connected via a last mile access line to a transport network. The method 700 may comprise, via a network interface to the transport network, in a step titled "OBTAINING EQUIPMENT IDENTIFIER", obtaining 710 an equipment identifier which uniquely identifies the customer-premises equipment, in a step titled "OBTAINING LINE IDENTIFIER", obtaining 720 a line identifier which identifies the line terminal, and in a step titled "SEARCHING TRUSTED ACCESS DATABASE", searching 730 a trusted access database for an entry containing a combination of the equipment identifier and the line identifier. The method 700 may further comprise determining 740 if the entry is found and determining 760 if the entry contains a user identifier having user credentials which are valid according to an authorization database, and if so, in a step titled "GRANTING NETWORK ACCESS", granting 770 the network access to the customer-premises equipment. If the entry is not found, the method 700 may further comprise, in a step titled "GRANTING TEMPORARY ACCESS TO PRIVATE NETWORK", granting 750 temporary access to a private network which enables a user identifier and user credentials to be digitally submitted, and if the user credentials are determined 760 to be valid according to the authorization database, continuing with the aforementioned step of granting 770 the network access to the customer-premises equipment. It will be appreciated that the steps of the computer-implemented method 700 of FIG. 8 may be performed in any suitable order, e.g., consecutively, simultaneously, or a combination thereof, subject to, where applicable, a particular order being necessitated, e.g., by input/output relations.

Figure 9:
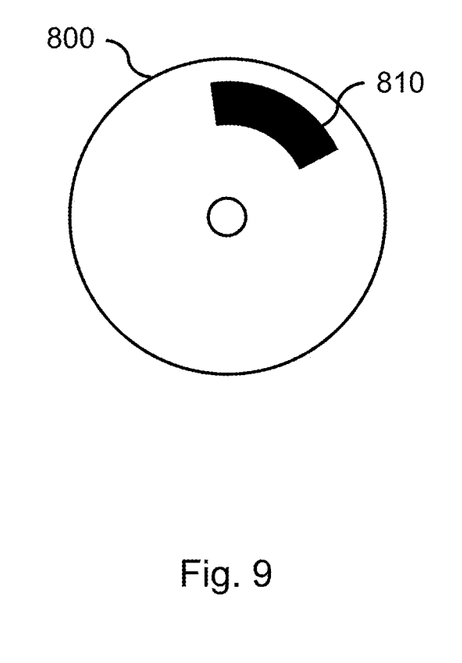
FIG. 9 shows a computer-readable medium comprising data.

It is noted that any of the methods described in this specification, for example in any of the claims, may be implemented on a computer as a computer-implemented method, as dedicated hardware, or as a combination of both. Instructions for the computer, e.g., executable code, may be stored on a computer readable medium 800 as for example shown in FIG. 9, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows by way of example an optical storage device 800.

Figure 10:
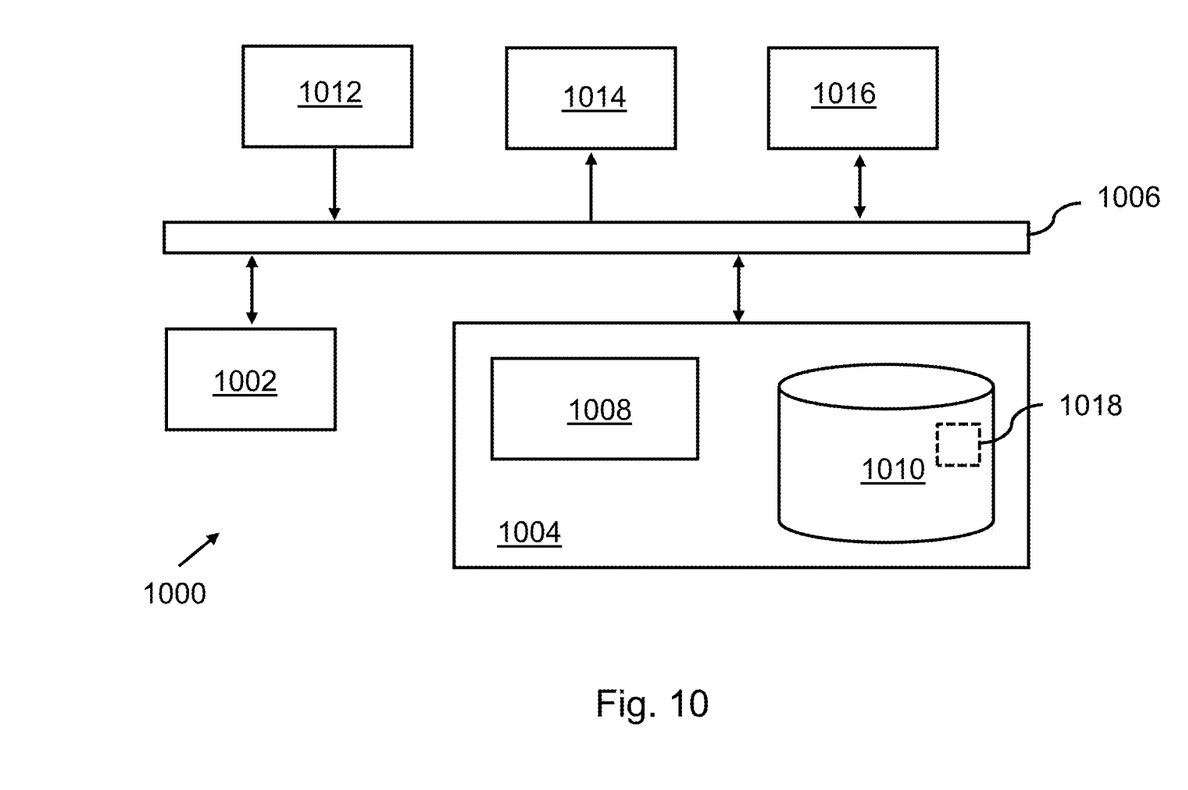
FIG. 10 shows an exemplary data processing system.

FIG. 10 is a block diagram illustrating an exemplary data processing system that may be used in the embodiments described in this specification. Such data processing systems include data processing entities described in this specification, including but not limited to data processing entities implementing functions such as but not limited to the server for controlling network access of customer-premises equipment, being in a specific example a RADIUS or HSS. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification. Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Ethernet cards, fiberoptic interfaces, modems are examples of different types of network adapters that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the server configured for controlling network access of customer-premises equipment. In that case, application 1018 may represent an application that, when executed, configures data processing system 1000 to perform the functions described herein with reference to the server configured for controlling network access of the customer-premises equipment. In another aspect, data processing system 1000 may specifically implement the RADIUS or HSS. In that case, application 1018 may represent an application that, when executed, configures data processing system 1000 to perform the functions described herein with reference to the RADIUS or HSS.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for controlling access of customer-premises equipment to a network, wherein the customer-premises equipment is connected via a last mile access line to a transport network and via the transport network to the network, wherein the last mile access line terminates at a line terminal in the transport network, the system comprising:
   a network interface to the transport network;
   a processor subsystem configured to, via the network interface:
      obtain an equipment identifier which uniquely identifies the customer-premises equipment;
      obtain a line identifier which identifies the line terminal;
      search a trusted access database for an entry containing a combination of the equipment identifier and the line identifier; and
      a) if the entry is found and if the entry contains a user identifier having user credentials which are valid according to an authorization database, grant the customer-premises equipment access to the network via a service provider which is identified in the entry;
      b) if the entry is not found, grant temporary access to a private network which enables a user identifier and user credentials to be digitally submitted, and if the user credentials are valid according to the authorization database, grant the customer-premises equipment access to the network.

2. The system according to claim 1, wherein the processor subsystem is configured to, if the entry is not found and in response to the user credentials being determined to be valid, create an entry in the trusted access database for the user identifier, the entry containing a combination of the equipment identifier and the line identifier.

3. The system according to claim 2, wherein the processor subsystem is configured to create the entry in the trusted access database by replacing one or more previous entries which exist for the user identifier or by creating the entry in the trusted access database in addition to the one or more previous entries.

4. The system according to claim 1, wherein the processor subsystem is configured to:
   obtain the equipment identifier,
   obtain the line identifier, and
   search the trusted access database for the entry containing the combination of the equipment identifier and the line identifier,
   at a start of a communication session between the customer-premises equipment and the transport network.

5. The system according to claim 1, wherein the processor subsystem is configured to grant the access to the network being one of:
   the Internet;
   a physical or virtual private network; and
   an application server which is network accessible.

6. The system according to claim 1, wherein the processor subsystem is configured to, if the user credentials are not known according to the authorization database, enable the user identifier and the user credentials to be digitally created in the authorization database via the private network.

7. The system according to claim 1, wherein the processor subsystem is configured to, if the user credentials are not valid according to the authorization database, enable the user credentials to be digitally revalidated in the authorization database via the private network.

8. The system according to claim 6, wherein the processor subsystem is configured to i) enable an electronic payment process to be performed via the private network, and ii) create or revalidate the user credentials in the authorization database subject to the electronic payment process having been completed successfully.

9. The system according to claim 1, wherein the processor subsystem is configured to enable the user identifier and the user credentials to be digitally submitted via one or more capture pages in the private network.

10. The system according to claim 1, wherein:
    the last mile access line is a Digital Subscriber Line (DSL) access line and the line terminal is a Digital Subscriber Line Access Multiplexer (DSLAM);
    the last mile access line is a cable access line and the line terminal is a Cable Modem Termination System (CMTS);
    the last mile access line is an optical network line and the line terminal is an Optical Line Terminal (OLT); or
    the last mile access line is a fixed wireless access line and the line terminal is a wireless access gateway.

11. The system according to claim 1, wherein the customer-premises equipment is one of:
    a residential gateway such as a modem, switch, router or access point;
    a set-top box; and
    a terminal device capable of being granted network access.

12. The system according to claim 1, wherein the system is part of or configured to interface with one of:
    a Remote Authentication Dial-In User Service (RADIUS) server;
    a Home Subscriber Server (HSS).

13. A computer-implemented method for controlling access of customer-premises equipment to a network, wherein the customer-premises equipment is connected via a last mile access line to a transport network and via the transport network to the network, wherein the last mile access line terminates at a line terminal in the transport network, the method comprising, via a network interface to the transport network:
    obtaining an equipment identifier which uniquely identifies the customer-premises equipment;
    obtaining a line identifier which identifies the line terminal;
    searching a trusted access database for an entry containing a combination of the equipment identifier and the line identifier; and
    a) if the entry is found and if the entry contains a user identifier having user credentials which are valid according to an authorization database, granting the customer-premises equipment access to the network via a service provider which is identified in the entry;
    b) if the entry is not found, grant temporary access to a private network which enables a user identifier and user credentials to be digitally submitted, and if the user credentials are valid according to the authorization database, granting the customer-premises equipment access to the network.

14. A computer-readable medium comprising transitory or non-transitory data representing a computer program, the computer program comprising instructions for causing a processor system to perform the method according to claim 13.

* * * * *